(12) United States Patent
Naruhn et al.

(10) Patent No.: US 10,582,068 B2
(45) Date of Patent: Mar. 3, 2020

(54) METHOD FOR OPERATING A PRINT SYSTEM FOR PRINTING OUT IMAGES AND/OR DOCUMENTS AND PRINTING SYSTEM FOR CARRYING OUT THE METHOD

(71) Applicant: di support GmbH, Eschborn (DE)

(72) Inventors: Ralph Naruhn, Dreieich (DE); Gordon Schaub, Obenursel (DE)

(73) Assignee: DI SUPPORT GMBH, Eschborn (DE)

( * ) Notice: Subject to any disclaimer, the term of this patent is extended or adjusted under 35 U.S.C. 154(b) by 0 days.

(21) Appl. No.: 16/160,698

(22) Filed: Oct. 15, 2018

(65) Prior Publication Data

US 2019/0116277 A1    Apr. 18, 2019

(30) Foreign Application Priority Data

Oct. 13, 2017 (DE) ................. 10 2017 123 938

(51) Int. Cl.
*G06F 3/12* (2006.01)
*H04N 1/00* (2006.01)
*G06F 21/60* (2013.01)
*G06K 15/00* (2006.01)

(52) U.S. Cl.
CPC ....... *H04N 1/00334* (2013.01); *G06F 3/1204* (2013.01); *G06F 3/1217* (2013.01); *G06F 3/1238* (2013.01); *G06F 3/1272* (2013.01); *G06F 3/1288* (2013.01); *G06F 3/1292* (2013.01); *G06F 21/608* (2013.01); *H04N 1/00132* (2013.01); *H04N 1/00143* (2013.01); *H04N 1/00188* (2013.01); *H04N 1/00204* (2013.01); *H04N 1/00209* (2013.01); *H04N 1/00244* (2013.01); *H04N 1/00307* (2013.01); *G06F 3/1281* (2013.01)

(58) Field of Classification Search
None
See application file for complete search history.

(56) References Cited

U.S. PATENT DOCUMENTS

| 2010/0091314 A1 | 4/2010 | LeVier et al. |
| 2013/0169996 A1* | 7/2013 | McLeod ................. H04L 67/36 358/3.28 |
| 2016/0170695 A1 | 6/2016 | Sakashita |
| 2016/0253127 A1 | 9/2016 | Panda |

OTHER PUBLICATIONS

German Patent Office, 1st Office Action for Application No. 10 2017 123 938.3, dated May 24, 2018.

* cited by examiner

*Primary Examiner* — Dov Popovici
(74) *Attorney, Agent, or Firm* — Socal IP Law Group LLP; Jonathan Pearce

(57) ABSTRACT

The invention relates to a a printing system for printing out images and/or documents, the printing system having at least one printing module with a printer, an operator interface and a computer. A machine-readable code is read using a camera of the printing module to release a print order previously transmitted.

15 Claims, 3 Drawing Sheets

Figure 1:
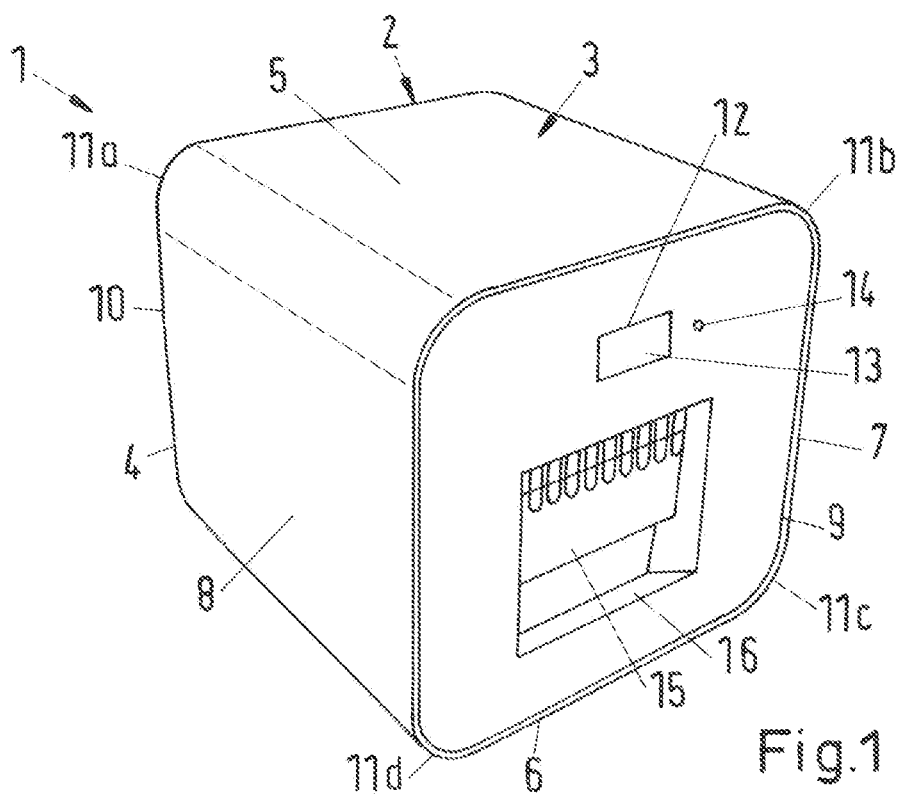

METHOD FOR OPERATING A PRINT SYSTEM FOR PRINTING OUT IMAGES AND/OR DOCUMENTS AND PRINTING SYSTEM FOR CARRYING OUT THE METHOD

The invention relates to a method for operating a printing system for printing out images and/or documents and to a printing system for carrying out the method.

Such printing systems are also referred to for example as "print terminals" or "instant print kiosks" and are used for example in retail outlets such as branches of drugstore chains, supermarkets and the like, to enable customers to print out their digital images from a terminal, such as for example from a cell phone or smart phone. The known printing systems often also have a possibility for reading digital storage media, such as for example USB sticks or memory cards.

The selection of images to be printed is generally made after connecting the cell phone or the storage medium via an operator interface of the printing system, the image then being subsequently output by means of a printer of the printing system that is assigned to the operator interface. With this procedure, the usually time-intensive selection of the images to be printed, and possibly the matter of deciding on image sections and performing further post-editing, means that the corresponding printer is blocked for a relatively long time.

A known solution in the case of stationary terminals provides that the print order with the images or documents to be printed is loaded onto a central server, for example via the Internet. The print order is then processed there, and the printed-out images or documents are sent to the user. Alternatively, the images or documents are for example left at a high-street store to be determined in advance and can be picked up there by the user.

The known solutions in themselves operate satisfactorily, but offer only little flexibility. Furthermore, to speed up the whole procedure, a relatively large number of printers and operator interfaces would have to be provided, which however is often not possible for reasons of space and cost.

The invention is therefore based on the object of overcoming the disadvantages of the prior art and providing a method for operating a printing system and a corresponding printing system that can be scaled relatively easily, while operating times required by a user are kept low.

In the case of a method for operating a printing system for printing out images and/or documents, the printing system having at least one printing module with a printer, an operator interface and a computer, it is provided according to the invention that a machine-readable code is read in by means of a camera of the printing module to release a print order previously transmitted.

The creation of the print order, that is to say in particular the selection and possibly post-editing of the images and/or documents, is in this case performed without directly making use of a printer of the printing system. Accordingly, in theory any number of users can create and transmit print orders at the same time on their own terminal. After transmission of the print order, a machine-readable code is then generated and sent to the user's terminal. With this machine-readable code, that is to say for example a so-called QR code or some other two-dimensional code, the user then goes to the desired printing module and allows the code to be read in by means of its camera. Consequently, the activation of the print order and the output of the images or documents take place as it were by means of its printer. In this case, operation is extremely easy, since the machine-readable code is simply read out from the printing system, without an often error-prone input by the user being required. Furthermore, the completion of the images or documents takes place in the spatial vicinity of the operator interface of the printing module, directly after reading in of the code, so that the user can remove the images or documents directly. The risk of the images or documents being mixed up is therefore kept low.

Preferably, a wireless access network is provided by the printing system. This access network is then used to link in all of the printing modules of the printing system, so that it can be ensured that any desired printing module can be selected by the user after transmission of the print order to the printing system. Furthermore, a wireless access network based on one of the known standards, that is to say a so-called WLan, offers the advantage that no physical connection has to be established between the user's terminal and the printing system. Rather, access is possible for all WLan-compatible terminals, such as for example cell phones or smartphones, tablets or laptops, manufacturer-independently without any further adapters or the like, it being possible for even more terminals than the printing system has available printing modules to be able to gain access to the network simultaneously.

In the case of a preferred development, the printing system hosts a web access, which provides browser-based access for creating the print order. The creation of the print order in this case comprises in particular the selection and uploading of images and/or documents, which can be performed on the user's terminal, that is to say for example on a cell phone. The browser-based access in this case allows the creation and transmission of the print order to be performed platform-independently and without the installation of a special program.

It may alternatively or additionally be provided that the creation of the print order can be performed in a program, in particular off-line, the print order being transmitted to the printing system, or to a server assigned to the printing system, at a later point in time. Such a program may in this case possibly provide additional functions and also be used whenever the user is beyond the range of access to the access network provided by the printing system.

Preferably, the machine-readable code is generated when uploading the print order to the printing system, or a server assigned to the printing system, and is transmitted to the uploading terminal. The code can then be stored, displayed or printed out on the terminal and read in by means of the camera of the printing system at any desired point in time. Until then, although the print order has already been transmitted, the previously transmitted code is required for releasing and consequently printing the images or documents. The printing out of non-system images or documents is therefore virtually ruled out.

In a preferred configuration, the machine-readable code is transmitted to a cell phone and read out from a display of the cell phone by means of the camera of the printing system. The cell phone in this case represents a mobile terminal, from which possibly the print order was also previously transmitted to the printing system. The machine-readable code is consequently available to the user directly after transmission of the print order, so that the user can select the appropriate printing module for creating the images and/or documents directly or later. In this case, the cell phone can simply be held with its display in front of the camera of the printing system, so that in particular no previous printing out of the code is required.

In an alternative or additional configuration, it may be provided that the machine-readable code is applied to a print medium and is read out from there by means of the camera of the printing system. This allows the printing system also to be used with stationary terminals, which for example transmit the print order to the printing system via the Internet, the user being able to go to the printing system at a later point of time with the code applied to the print medium, in order to print out his or her images or documents there.

Preferably, the images and/or documents are prepared on the cell phone or in the printing system or on the server. Preparation may in this case take the form in particular of an adaptation to the color reproduction of the printer contained in the printing module. Furthermore, it may for example comprise a retouching of red eyes and lightening or darkening of individual regions. Furthermore, for example, sections may be decided on and these sections thus shown enlarged. However, further preparational operations, in particular by means of predefined or variable filters, are also conceivable.

In a preferred configuration, the print order may be uploaded from any desired Internet-compatible terminal to a central server and downloaded and output by the printing system from the server after reading in the machine-readable code. As a result, the user can transmit the print order from any desired location with Internet connection to the server, and only later has to decide at which printing system and by means of which printing module the images or documents are output. The server in this case represents a central storage facility that can be accessed by all of the printing systems connected to it, independently of the location where they are set up. This access is in this case initialized by reading in the machine-readable code, which uniquely identifies the print order to be processed.

More preferably, for selecting a printing module, the corresponding printing module is first activated by touching a touch-sensitive display, and the machine-readable code is subsequently read in by means of the camera. Touching the display in this case has the effect in particular of waking up the camera, which as a result only ever has to be supplied with power over a relatively short time. Consequently, energy consumption is kept low and uninterrupted surveillance of the surrounding area, which is often prohibited by legal regulations, is prevented. The touch-sensitive display is in this case in particular part of the operator interface of the printing module.

In a preferred configuration, different user levels of the printing module are released by means of the machine-readable code. The machine-readable code that is usually generated in conjunction with a print order in this case only releases basic functions of the printing module. However, further functions may then be released by means of another machine-readable code, for example for an administrator, allowing the settings on the printing module and/or printing system to be seen and changed. A kind of access control is thereby performed in a relatively easy way.

Preferably, additional information is introduced into the images and/or documents by means of the machine-readable code. This additional information may be for example crop marks, labelings or the like. In this case, in particular, an additional code may be read in. This additional code may be read in by the printing module after the code associated with the print order. An alternative solution may provide that this code is read in by the terminal, that is to say for example the user's smartphone. It can subsequently be read in by holding the terminal in front of the camera of the printing module.

It is also conceivable that the reading in of the additional code leads to a defined amendment of the code for the print order, so that only a single code has to be read in by the printing module.

In this case, it is particularly preferred that additional consumer articles such as photo frames are provided by the printing system, and these are in particular respectively provided with a second machine-readable code. The information desired for these consumer articles can then be taken into account in the print order by reading in the second machine-readable code.

Advantageously, the printing modules of a printing system are interconnected with one another, it being possible in particular for them to share the respective storage and computing capacities. The respective printing module then does not require a particularly powerful computer, since if need be the computers of a number of printing modules can together provide sufficiently great power. In addition, a central computer unit, which in particular can be switched on as and when required, may be provided.

In the case of a printing system for carrying out the method, it is provided according to the invention that it has at least one printing module with a printer, an operator interface and a computer, the operator interface having a camera for reading in a machine-readable code.

The number of printing modules that are combined to form a printing system allows a capacity appropriate for demand to be provided. A printing module is in this case only directly operated, and consequently occupied, by a user for a relatively short time, which is required for the reading in of the code and the actual printing operation. Altogether, a high level of utilization of the printing system can thus be achieved, with low waiting times for the operators.

In this case it is particularly preferred that the printing module has a cuboidal housing, in particular a number of printing modules being arranged one above the other and/or next to one another and interconnected with one another. This configuration allows the printing system to be adapted well to different spatial circumstances. In particular, it is in this way possible to provide a relatively large number of printing modules with good accessibility in a confined space.

Figure 2:
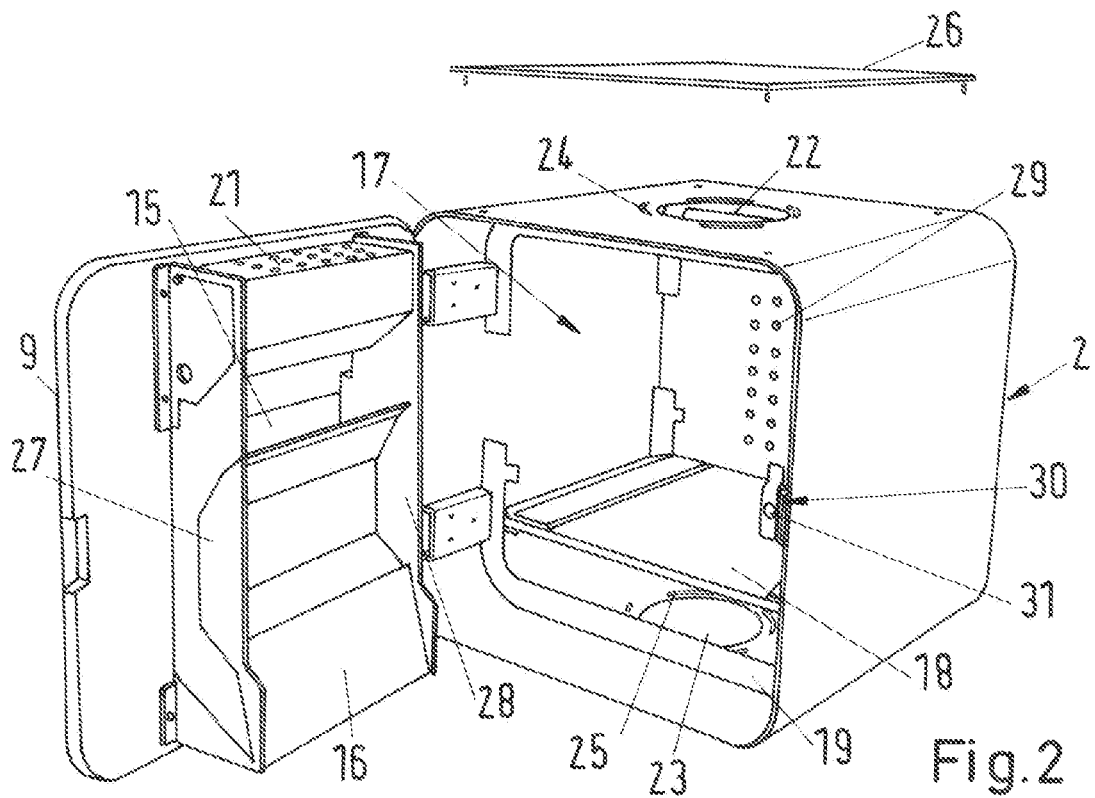
Figure 3:
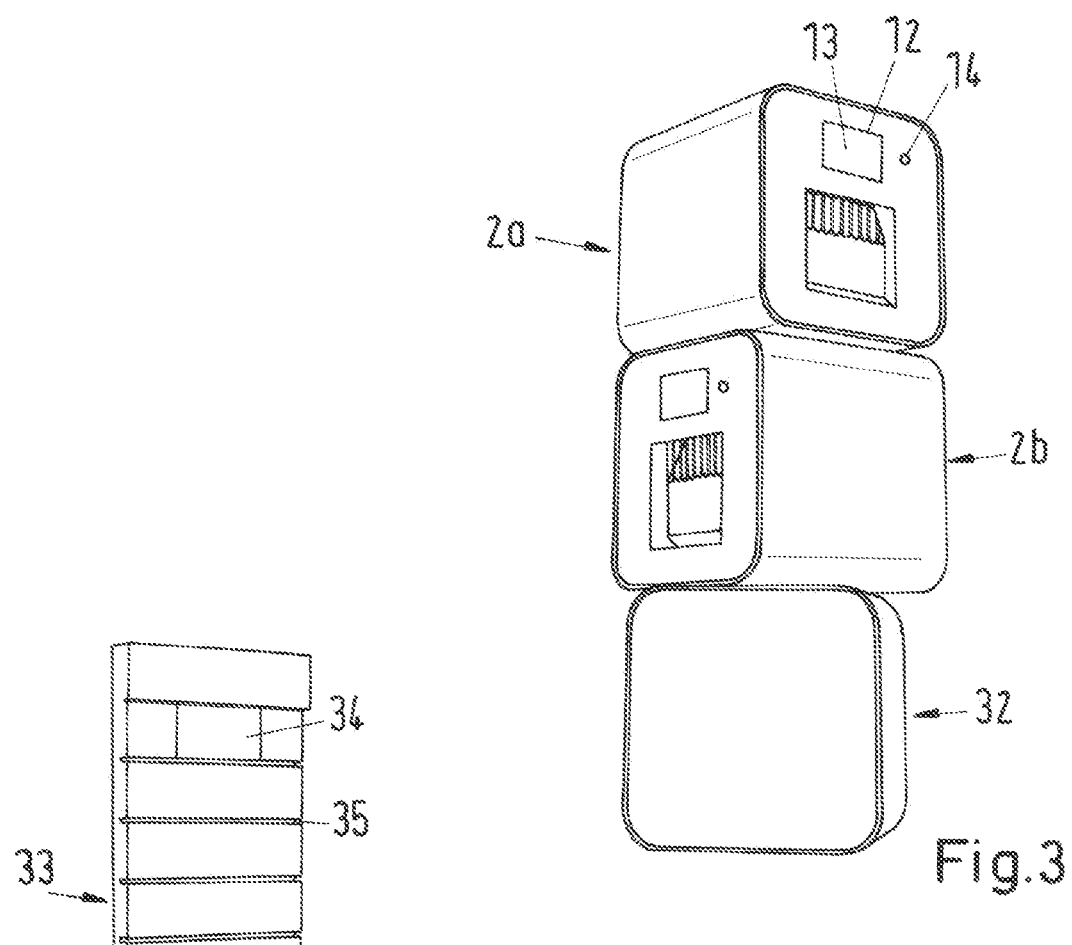
Figure 4:
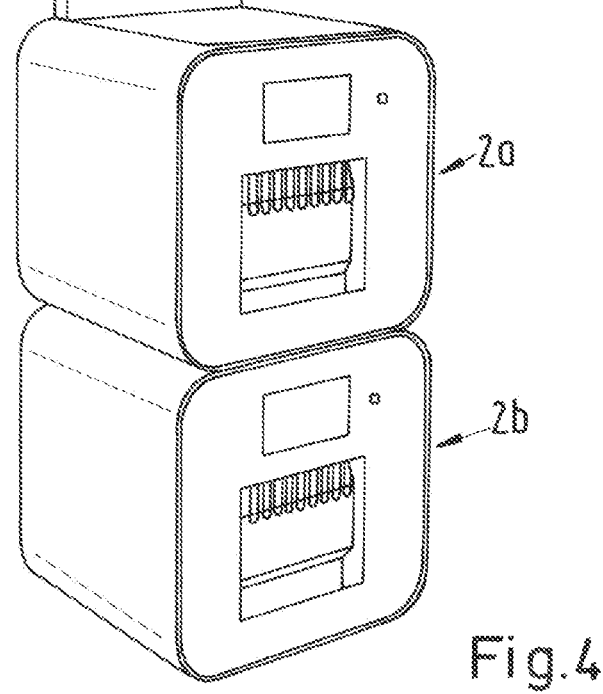
Figure 5:
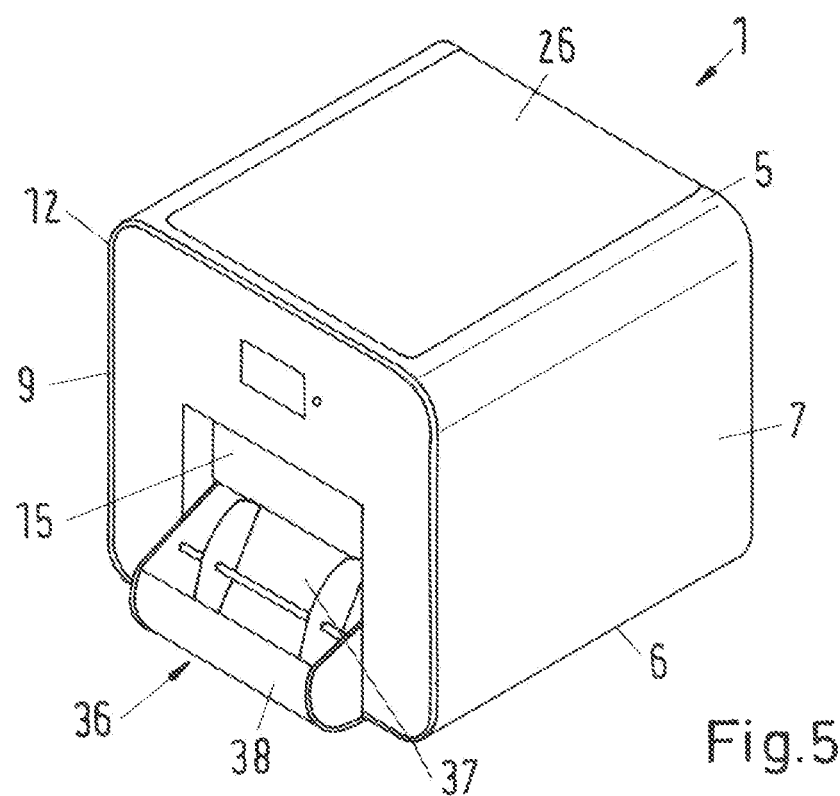
Figure 6:
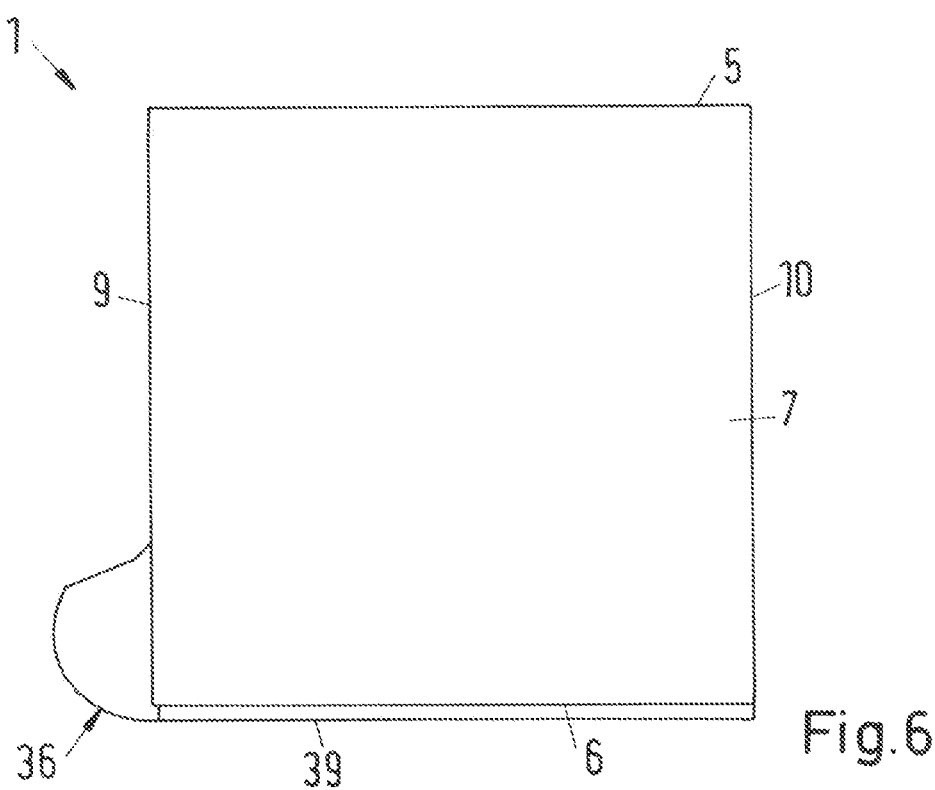

Further features, details and advantages of the invention will emerge from the wording of the claims and from the following description of exemplary embodiments on the basis of the drawings, in which:

FIG. 1 shows a printing module of a printing system in a three-dimensional view, FIG. 2 shows the printing module with the front part opened, FIG. 3 shows a printing system with a number of printing modules, FIG. 4 shows a printing system with a number of printing modules and a multifunctional element, FIG. 5 shows the printing module with a collecting element in a three-dimensional view and FIG. 6 shows the printing module as shown in FIG. 5 in side view.

In FIG. 1, a printing system 1 with a printing module 2 is shown in a three-dimensional representation. The printing module 2 has a cuboidal housing 3 with a body 4. The body 4 comprises a top part 5 and a bottom part 6, which are respectively connected to one another by means of side parts 7, 8 in such a way that the top part 5 and the bottom part 6 with the two side parts 7, 8 form the body 4 in the form of a rectangular frame. On the front side, the body 4 is closed by a front part 9, and on the rear side it is closed by a rear part 10. Edges 11*a*, 11*b*, 11*c*, 11*d* of the body, that is to say transitions from the side parts 7, 8 to the bottom part 6 and the top part 5, are in this case rounded to a relatively great extent. This allows a one-part or one-piece production of the body 4, and for example minimizes the risk of a user catching himself or herself on these edges. In this case, the body 4 and also the front part 9 and the rear part 10 are preferably produced from a plastic.

An operator interface 12 is formed in the front part 9. The operator interface 12 in this case comprises a touch-sensitive display 13, that is to say a so-called touch display, and also a camera 14.

In the front part 9 there is also unhindered access through a removal opening 15 to a removal compartment 16, which is fastened to the inside of the front part 9, and consequently lies within the housing 3. The removal compartment 16 serves for receiving finished print media such as images and/or documents and covers the removal opening 15 on the inside in such a way that no access is possible through the removal opening 15 to a receiving space for a printer that is formed in the housing 3.

In FIG. 2, the printing module 2 is shown with an opened front part 9. For this, the front part 9 is pivotably fastened on the side part 8 and can be opened like a door. As a result, it is possible to access the interior of the housing, in which a receiving space 17 for a printer is formed. The receiving space 17 is in this case divided by a shelf 18, on which the printer is positioned. The shelf 18 in this case rests on slats 19, which on the inside connect the side parts 7, 8 to one another and extend perpendicularly from the bottom part 6. In this case, the slats 19 have projections, on which the shelf 18 can be arranged at different heights. As a result, an adaptation to different printers can be performed.

Not only the removal compartment 16 but also a receiving compartment 21 are arranged on an inner side of the front part 9. The receiving compartment 21 is in this case located at a position in which it covers over the operator interface 12 visible from an outer side of the front part 9. Accommodated in the receiving compartment 21 is a computer in the form of a mini PC, such as for example a Raspberry Pi, which is connected to the operator interface and can activate a printer accommodated in the receiving space 17, for example via a USB (Universal Serial Bus). The computer also has wire-bound and wireless network connections.

The receiving compartment 21 and the removal compartment 16 are connected to one another by means of side walls 27, 28, and thereby form a unit. This produces a high degree of stability with a relatively large contact area in relation to the inner side 20 of the front part 9, which is consequently likewise stiffened.

A round opening 22, 23 is also respectively formed centrally both in the top part 5 and in the bottom part 6, and these round openings are surrounded by slits 24, 25 in the form of segments of a circle. On the one hand, an exchange of air, and consequently a cooling of the receiving space 21, can take place through these openings 22, 23; on the other hand, lines for supplying power and transmitting data can be led through them into the interior of the housing 3. The slits 24, 25 may be used for a fastening device that is not shown, in order for example to fix printing modules 2 arranged one above the other to one another. In the simplest case, the fastening device is in this case formed by a number of pairs of screws and nuts.

An upper side of the top part 5 may be covered by a covering element 26. In the case of this exemplary embodiment, the rectangular covering element 26 has projecting feet in its corner regions, and these can be pushed into corresponding recesses in the top part 5 and thereby hold the covering element 26 on the body 4. Alternatively, a fastening geometry may also be formed on the covering element 26, with which it can be fastened, in particular locked in place, in the opening 22 or the slits. A recess may possibly be formed in the top part 5, in order to receive the covering element 26 more or less flush.

Ventilation openings 29, the shape and number of which may vary, are formed in the rear part 10. Furthermore, for a good exchange of air, and consequently good cooling of the receiving space 17, ventilation slits are formed between the front part 9 and the body 4 and also between the rear part 10 and the body 4, and in particular these slits run parallel to the body and are so narrow that at first glance they are unnoticed. Nevertheless, they can provide good venting.

The front part 9 is pivotably fastened on the side part 8 and can be fixed on the other side part 7 by means of a holding device 30, which comprises a lock 31, which can be operated by means of a key. Unauthorized opening of the printing module 2 can consequently be reliably prevented. Instead of a mechanical lock 31, a magnetic lock for example could alternatively also be used, but this does not generally offer protection from theft.

Represented in FIG. 3 is a printing system with two printing modules 2*a*, 2*b* arranged one above the other, which are arranged on a further module 32. The further module 32 only differs from the printing modules 2*a*, 2*b* by a different type of front part, without an operator interface and removal opening. Otherwise, the module 32 is structurally the same as the printing modules 2*a*, 2*b* and offers additional storage space, for example for consumable materials.

The printing modules 2*a*, 2*b* and the module 32 are connected to one another by means of fastening devices that are not shown and are fixed at a desired angle about their vertical axis. In this case, the fastening devices engage in the slits in the form of segments of a circle, an upper side of the uppermost printing module 2*a* being provided with a covering element. The printing modules are in this case supplied with power and data by means of lines that are led invisibly through the corresponding openings.

Represented in FIG. 4 is a further printing system with two printing modules 2*a*, 2*b*, a multifunctional element 33 being arranged on an upper side of the upper printing module 2*a* and extending perpendicularly to the upper side of the printing module 2*a*. In the case of this example, the multifunctional element 33 has a display 34 and also slots 35, into which terminal boards, hooks and the like can be introduced.

The designs as shown in FIG. 3 and FIG. 4 may of course be combined with one another and with further printing modules without any problem in order to obtain a printing system with the respectively desired capacity. In this case, more preferably all of the printing modules of a printing system are interconnected with one another and provide a common access network, that is to say a so-called hotspot, for the users. In this case the printing modules may in particular share their respective computing and storage capacities. The selection of the printing module for the output of the images or documents is then only made by the user after selecting and uploading the corresponding files. In this case, the selection is made by means of the operator interface, for example by entering a specific code, more preferably a machine-readable code being read in by means of the camera of the operator interface, and displayed for example on the screen of the cell phone. The printing operation can then start very promptly, so that the printing module is already available to the next user after a relatively short time.

FIG. 5 shows the printing module 1 in a three-dimensional view, a collecting element 36 having been hung in the removal opening 15 for print media on an outer side of the front part 9. Longer print formats, such as panoramic prints or banners, are in this case directed out of the removal opening 15 by means of first deflecting elements 37 and then guided by means of a second deflecting element 38 in such a way that they finally pass under the bottom part 6 of the printing module 1.

It can be seen from the side view of the printing module 1 according to FIG. 6 that the print formats are in this case deposited on a continuation 39, which extends under the printing module 1 parallel to the bottom part 6.

As a result of corresponding feet or spacers (not shown) on the bottom part 6 of the printing module 1, sufficient space is available for the continuation 39, even when there are a number of printing modules 1 arranged one above the other, and the continuation 39 is not subjected to the load of the weight of the printing module 1.

In the case of the method according to the invention, the printing system is extremely easy for an operator to operate. Once the operator has uploaded the print order with the images or documents to be printed into the printing system, for example from a cell phone via the wireless access network of the printing system, the operator only has to hold his or her cell phone with the machine-readable code displayed on the display in front of the camera in order to start the printing operation.

Incorrect inputs are in this case as good as ruled out, and operation is possible even without instructions.

With the aid of a machine-readable code, further functions can also be called up. For example, photo frames, which are provided with a second machine-readable code, are offered. This code may likewise be read in in the camera, and for example adds crop marks to the images, so that the images can be adapted relatively easily to the geometry of the photo frame.

Furthermore, there is the possibility of printing a further machine-readable code, for example on a key that is required for opening the printing module. When this code is read in by the camera, further functionalities are enabled, and for example the changing of settings, the display of counter readings and filling levels and the like is allowed.

The invention is not restricted to one of the embodiments described above, but can be modified in various ways. Thus, for example, the printing system may also comprise more than the printing modules shown. Instead of the cube form with edges of equal length that is shown, the housing could also be extended at least in one spatial direction.

All features and advantages which emerge from the claims, from the description and from the drawing, including structural details, spatial arrangements and method steps, may be essential to the invention both individually and in a wide variety of combinations.

LIST OF REFERENCE SIGNS

1 Printing system
2 Printing module
3 Housing
4 Body
5 Top part
6 Bottom part
7 Side part
8 Side part
9 Front part
10 Rear part
11 Edge
12 Operator interface
13 Touch-sensitive display
14 Camera
15 Removal opening
16 Removal compartment
17 Receiving space
18 Shelf
19 Slat
20 Inner side
21 Receiving compartment
22 Opening
23 Opening
24 Slit
25 Slit
26 Covering element
27 Side wall
28 Side wall
29 Ventilation opening
30 Holding device
31 Lock
32 Module
33 Multifunctional element
34 Display
35 Slot
36 Collecting element
37 First deflecting element
38 Second deflecting element
39 Continuation

The invention claimed is:

1. A method for operating a printing system for printing out images or documents, the printing system comprising at least one printing module with a printer, an operator interface and a computer; the method comprising reading a machine-readable code using a camera accessible to the printing module to thereby receive instructions to release a print order previously received by the printing module, wherein said method further comprises:
generating the machine-readable code after uploading the print order to the printing system using an uploading terminal, or a server assigned to the printing system; and
transmitting the machine-readable code to the uploading terminal.

2. The method as claimed in claim 1, wherein the printing system further comprises a wireless access network.

3. The method as claimed in claim 1, wherein the printing system hosts a web access, which provides browser-based access for creating the print order.

4. The method as claimed in claim 1, further comprising:
creating the print order by selecting the images or documents in a program off-line; and
transmitting the images or documents to the printing system, or to the server assigned to the printing system, at a later point in time.

5. The method as claimed in claim 1, further comprising:
transmitting the machine-readable code to a cell phone; and
reading the machine-readable code from a display of the cell phone using the camera of the printing system.

6. The method as claimed in claim 5, wherein the images or documents are prepared on the cell phone or in the printing system or on the server.

7. The method as claimed in claim 1, wherein the machine-readable code is output onto a print medium and is read out from the print medium using the camera of the printing system.

8. The method as claimed in claim 1, wherein the print order is uploaded from any desired Internet-compatible terminal to a central server and downloaded and output by the printing system after reading in the machine-readable code.

9. The method as claimed in claim 1, wherein, when selecting the printing module, the selected printing module is first activated by touching a touch-sensitive display, and the machine-readable code is subsequently read in using the camera.

10. The method as claimed in claim 1, wherein different user levels of the printing module are released using the machine-readable code.

11. The method as claimed in claim 1, wherein additional information is introduced into the images or documents using the machine-readable code.

12. The method as claimed in claim 1, wherein additional consumer articles such as photo frames are provided by the printing system, and these consumer articles are in particular respectively provided with a machine-readable code.

13. The method as claimed in claim 1, wherein printing modules of the printing system are interconnected with one another, sharing respective storage and computing capacities.

14. A system for carrying out the method as claimed in claim 1, wherein said printing system comprises the at least one printing module with the printer, the operator interface, and the computer, the operator interface including the camera for reading the machine-readable code.

15. The system as claimed in claim 14, wherein each of at least two printing modules has a cuboidal housing and each printing module is arranged one above or next to another and each printing module is interconnected.

* * * * *

UNITED STATES PATENT AND TRADEMARK OFFICE
CERTIFICATE OF CORRECTION

Page 1 of 1

PATENT NO. : 10,582,068 B2
APPLICATION NO. : 16/160698
DATED : March 3, 2020
INVENTOR(S) : Naruhn et al.

It is certified that error appears in the above-identified patent and that said Letters Patent is hereby corrected as shown below:

On the Title Page

Item (57) In the Abstract Line 1: delete the duplicate "a" before the word "printing".

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*